Figure 1:
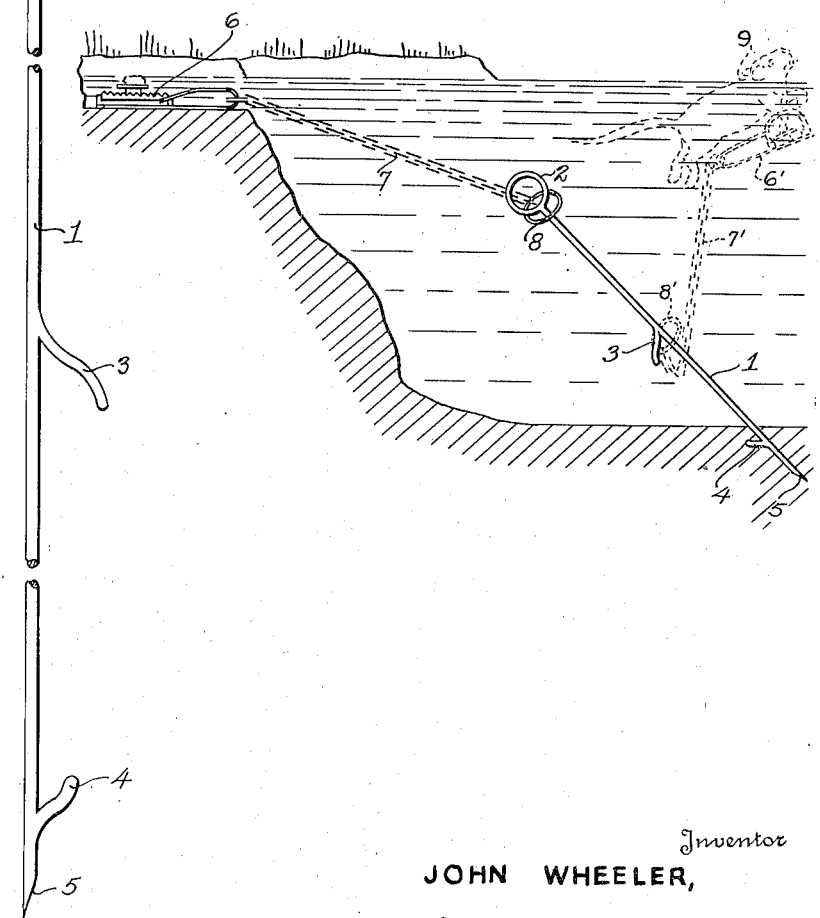

May 31, 1949.    J. WHEELER    2,471,804
ANIMAL TRAP
Filed Nov. 2, 1945

Inventor
JOHN WHEELER,

Patented May 31, 1949

2,471,804

UNITED STATES PATENT OFFICE 2,471,804

ANIMAL TRAP

John Wheeler, Knox, Ind.

Application November 2, 1945, Serial No. 626,192

2 Claims. (Cl. 43—96)

The present invention relates to improvements in animal traps and has particular reference to an attachment for securing the trap to a suitable support. It is well known that fur bearing animals which inhabit the banks of rivers and streams, after being trapped, plunge into the water and that thereafter it is their habit to move the trap to the bank of the river or stream, or to shallow water along said river or stream, and there attempt to extricate themselves by gnawing off a limb or limbs held by the trap.

It is an object of the present invention to provide a device for preventing the return of a trapped animal to the bank of a river or stream or to shallow water, once the animal has proceeded to deep water.

It is a further object of the present invention to provide a device of the character described which is simple of construction, cheap and readily operated.

With the above and other objects in view, which will more fully hereinafter appear, the present invention consists in certain novel details of construction and arrangement of parts, hereinafter fully described, illustrated in the accompanying drawings and more particularly pointed out in the appended claims.

Refer now to the drawings, wherein similar numerals of reference are employed to designate corresponding parts in the several views, and wherein:

Figure 1 is a plan view of the device and Figure 2 is a perspective view of the device in operative position and also showing the manner of attaching an animal trap to the device.

My novel device may be constructed of heavy wire, iron rod or iron strap and consists in a straight shank 1, having a ring formation 2 at one end which ring is conveniently arranged for carrying the device and which is larger in diameter than the ring which is usually attached to the end of a trap chain, and with a point formation 5 at the opposite end.

About midway of the length of shank 1 a hook 3 is formed, as by welding to shank 1 or by any other convenient means, the mode of manufacturing my device forming no part of my invention. Adjacent the end of my device opposite to the ring, and denominated 5 in the drawings, is a barb 4, which may be smaller than hook 3. Point 5 of my rod should preferably be sharp, since this end of the device is intended to be inserted into the ground.

Figure 2 illustrates the manner of inserting my device into the ground in deep water, adjacent to the bank of a river or stream. The device is preferably inserted into the ground at an angle of about forty-five degrees, and to a sufficient extent that barb 4 will be firmly embedded. In this condition barb 4 prevents retraction by the animal of my novel trap stake from its embedded position.

Prior to insertion of my trap stake into the ground, as illustrated in Figure 2 of the drawings, ring 8 attached to the chain 7 of trap 6 is placed on shank 1, adjacent to ring 2. The trap 6 is set in shallow water, as illustrated in Figure 2 at a distance from stake 1 which depends upon the length of chain 7.

When an animal 9 is caught in trap 6, the animal 9 will promptly dive to deep water carrying the trap as illustrated at $6^1$. This action of the animal will cause the trap chain ring 8, which had been set high on shank 1, to drop to a position below hook 3, as shown at $8^1$.

After diving the animal will attempt to carry the trap to the bank or adjacent thereto, for the purpose of gnawing off the portion of the anatomy secured in the trap. My novel stake will prevent this action since the ring 8 will be secured against upward translation by hook or prong 3. The animal being unable to return to shore or shallow water will drown and may be retrieved by the trapper.

From the foregoing it will be evident that I have provided a device which is extremely simple in structure and inexpensive to manufacture, embodying no moving parts and no parts subject to derangement.

While I have disclosed one specific embodiment of my device, it must be realized that modifications of the specific structure may be made without violating the spirit of the invention, and that I desire, consequently, to be limited only by the language of the following claims.

What I claim is:

1. A trap stake comprising a rod having a ring formation at one end and a point formation at its opposite end, a hook extending from the mid-length portion of said rod, and directed toward the pointed end thereof, and a barb extending from said rod adjacent to and directed away from said pointed end.

2. A trap stake adapted to slidably receive a trap chain ring and comprising a rod pointed at one end and provided at its opposite end with means restraining a trap chain ring against separation therefrom and having a straight shank between said pointed end and said ring-retaining means, ground-engaging means extending from said shank adjacent the pointed end thereof, and trap chain ring engaging means extending from said shank intermediate the length thereof to confine said trap chain ring to the lower portion of said shank once it has moved past said ring-engaging means.

JOHN WHEELER.

REFERENCES CITED

The following references are of record in the file of this patent:

UNITED STATES PATENTS

| Number | Name | Date |
|---|---|---|
| 221,497 | Beal | Nov. 11, 1879 |
| 985,555 | Shaw | Feb. 28, 1911 |
| 2,058,751 | Woolfrey | Oct. 27, 1936 |